(12) United States Patent
Arai

(10) Patent No.: US 7,451,710 B2
(45) Date of Patent: Nov. 18, 2008

(54) ACTUATOR AND TABLE DEVICE

(75) Inventor: Shigehiro Arai, Chiba (JP)

(73) Assignee: Seiko Instruments Inc. (JP)

( * ) Notice: Subject to any disclaimer, the term of this patent is extended or adjusted under 35 U.S.C. 154(b) by 436 days.

(21) Appl. No.: 10/980,703

(22) Filed: Nov. 3, 2004

(65) Prior Publication Data
US 2005/0140214 A1 Jun. 30, 2005

(30) Foreign Application Priority Data
Dec. 24, 2003 (JP) ............... 2003-426550

(51) Int. Cl.
*A47B 85/00* (2006.01)
(52) U.S. Cl. ..................................... 108/20
(58) Field of Classification Search .............. 108/20, 108/21, 22, 143; 74/16, 89.32, 89.33
See application file for complete search history.

(56) References Cited
U.S. PATENT DOCUMENTS

| | | | | |
|---|---|---|---|---|
| 4,423,686 A | * | 1/1984 | Ueno et al. ............... 108/20 |
| 4,653,408 A | * | 3/1987 | Nagashima et al. ........ 108/20 |
| 5,251,501 A | * | 10/1993 | Katahira .................. 74/89.39 |
| 5,586,468 A | * | 12/1996 | Tomotaki ................. 74/89.36 |
| 5,613,403 A | * | 3/1997 | Takei ...................... 74/490.09 |
| 5,676,016 A | * | 10/1997 | Nagai et al. .............. 74/89.32 |
| 5,724,893 A | * | 3/1998 | Lee et al. ................. 108/20 |
| 6,157,159 A | * | 12/2000 | Korenaga et al. ........ 318/649 |
| 6,244,192 B1 | * | 6/2001 | Suzuki et al. ............ 108/20 |

FOREIGN PATENT DOCUMENTS

| JP | 07170710 | 7/1995 |
| JP | 2002291220 | 10/2002 |
| JP | 2003121573 | 4/2003 |

\* cited by examiner

*Primary Examiner*—José V Chen
(74) *Attorney, Agent, or Firm*—Adams & Wilks

(57) ABSTRACT

In order to achieve miniaturization and high accuracy in movement, an actuator comprises a stationary shaft extending in a predetermined direction, a needle movable along the stationary shaft, one of the stationary shaft and the needle having a permanent magnet, and the other of the stationary shaft and the needle comprising a linear motor having a coil, a guide rail extending in parallel to the stationary shaft and interposing the needle inside to guide the same, and a pair of support means interposed between the guide rail and the needle to movably support the needle, points of action of the pair of support means and an axis of the stationary shaft being consistent with each other.

32 Claims, 12 Drawing Sheets

FIG. 9
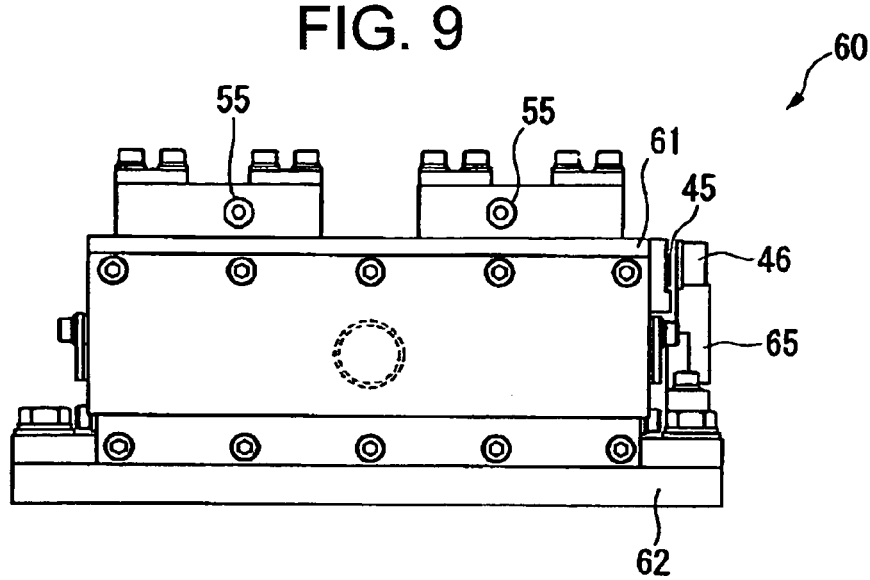
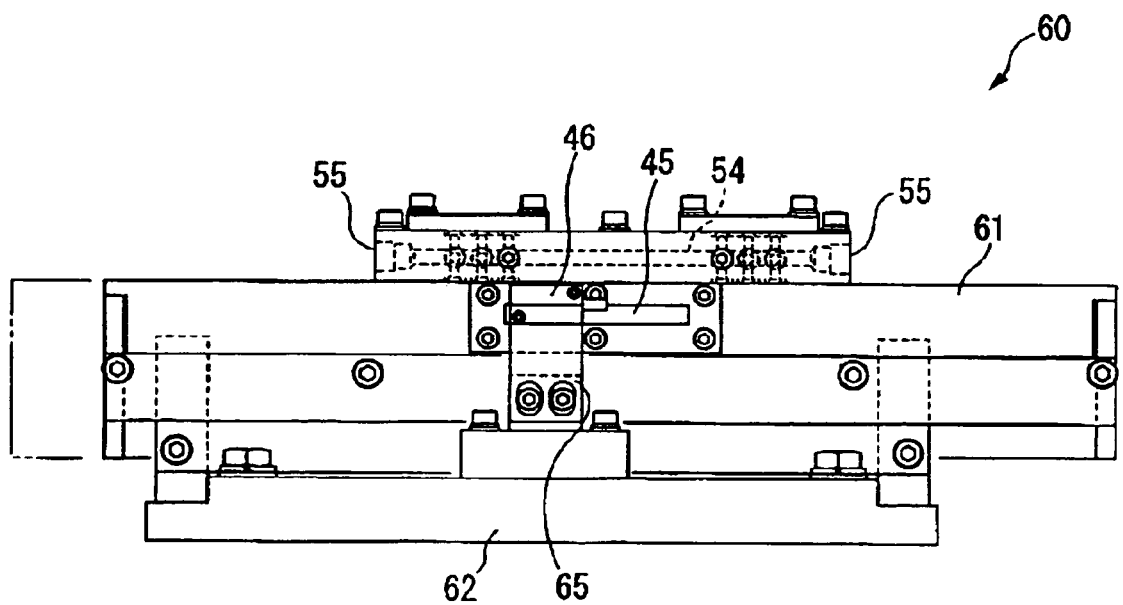
FIG. 10

FIG. 14
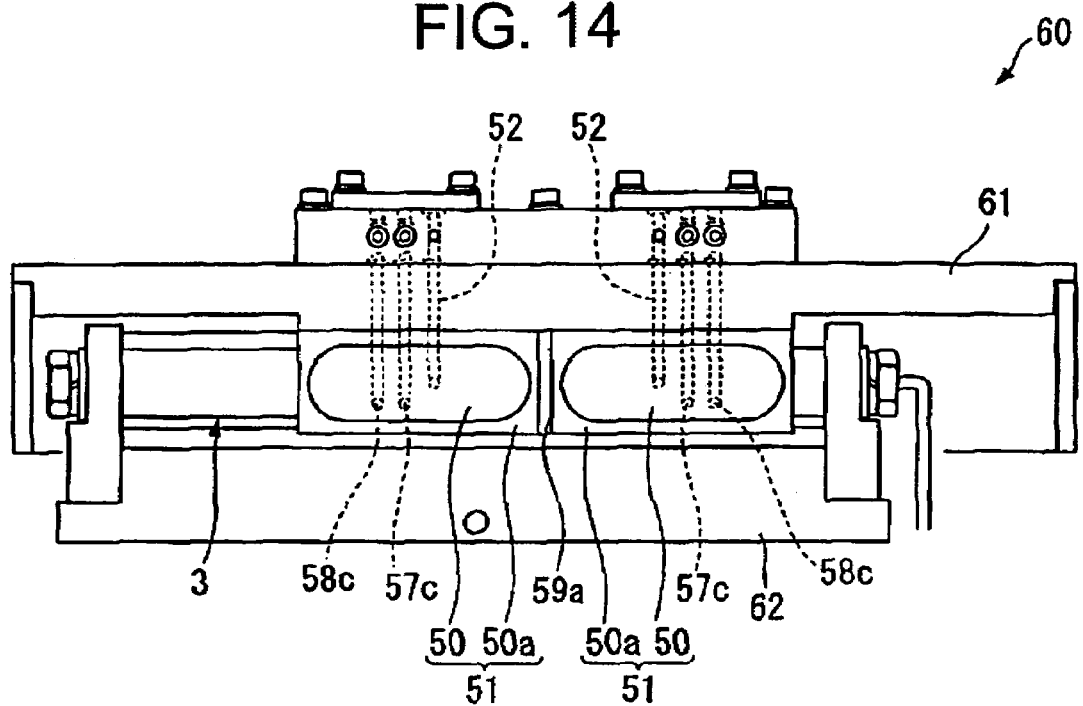
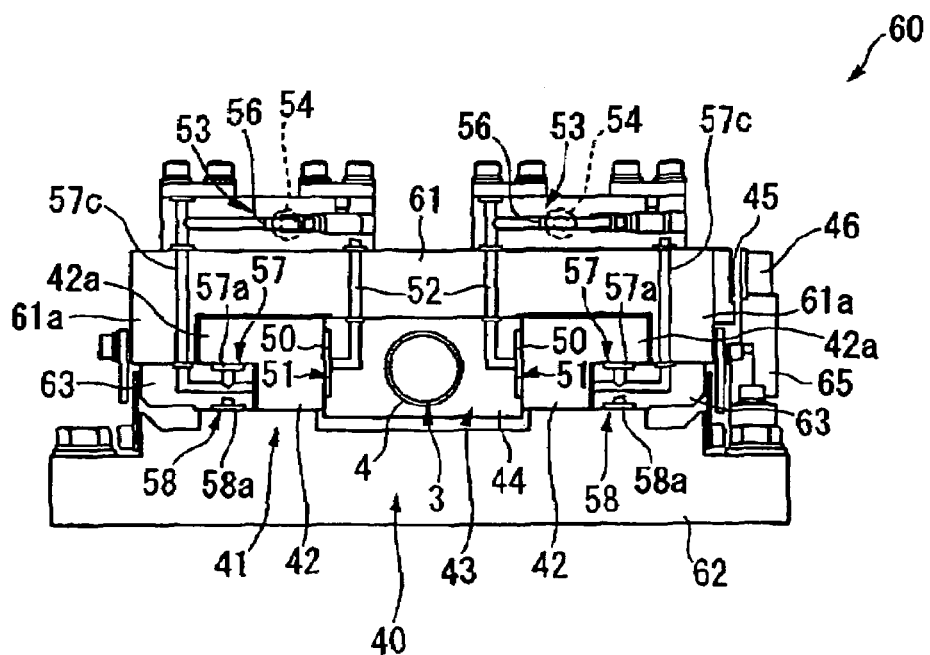
FIG. 15

FIG. 16
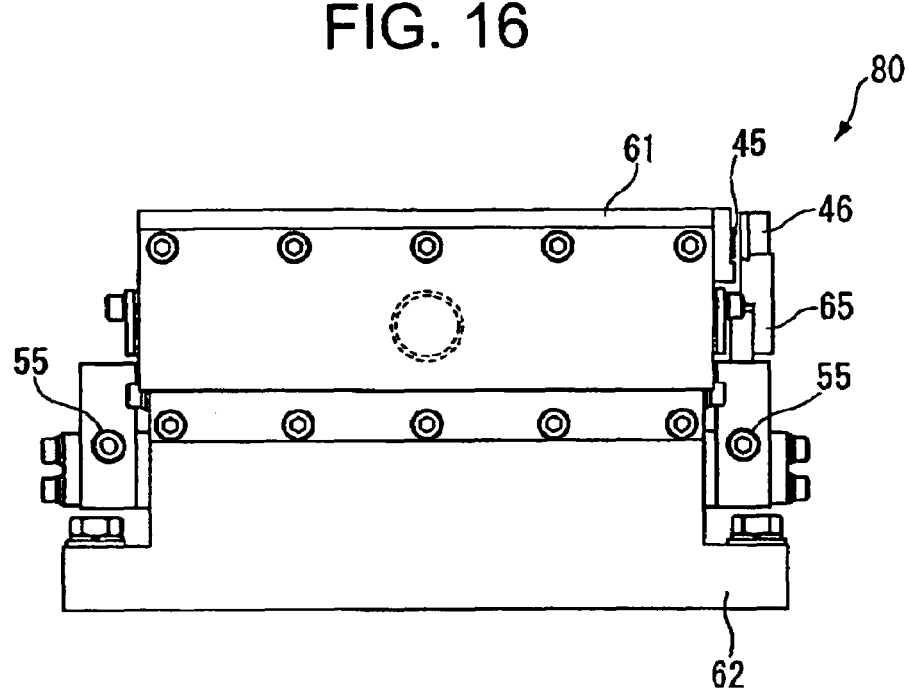
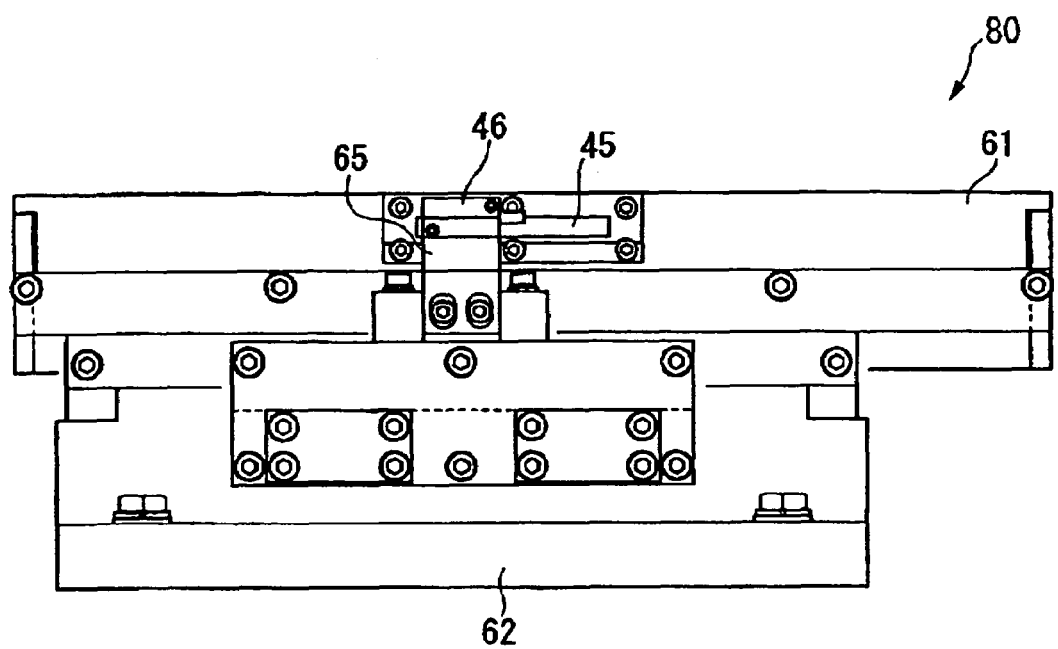
FIG. 17

FIG. 19
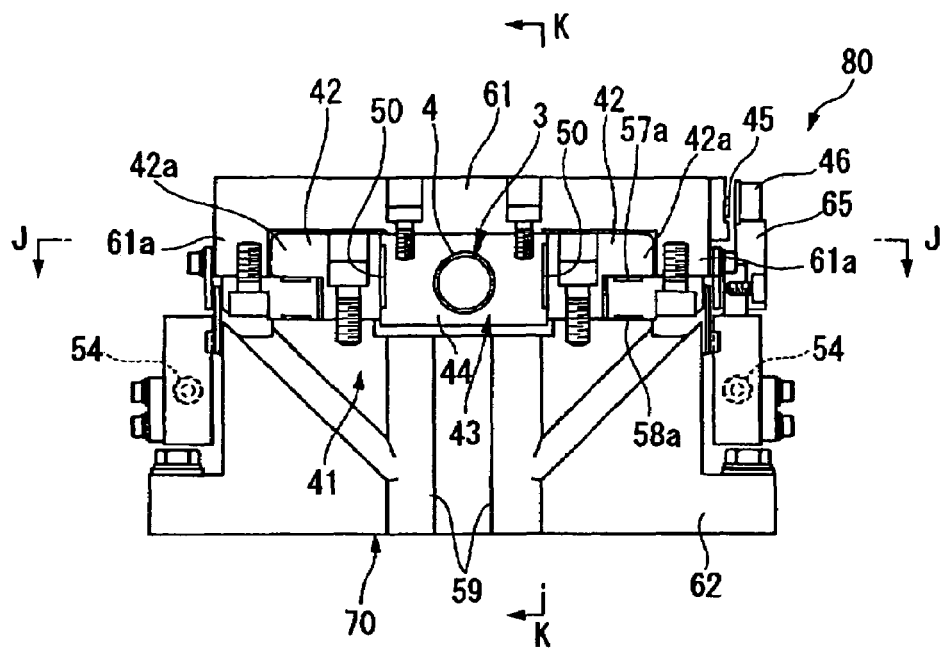
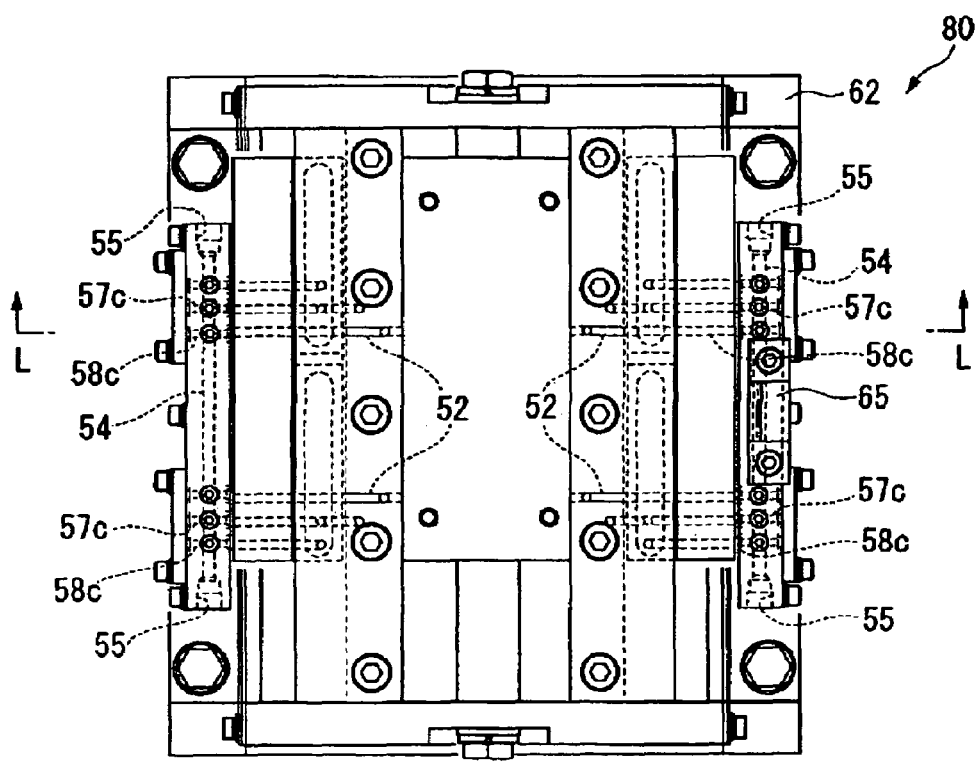
FIG. 20

ACTUATOR AND TABLE DEVICE

BACKGROUND OF THE INVENTION

The present invention relates to an actuator having a linear motor and a table device provided with the actuator.

Generally, a linear motor is constituted by a stationary shaft such as a permanent magnet, etc. and a needle such as a coil, etc. Also, since linear motors do not normally include a guide mechanism for a moving direction, it is necessary to provide a linear guide (guide mechanism) for straight or curved advancement in a direction, in which a needle moves, in the case where a linear motor is incorporated in a table, etc. to be used. That is, a linear guide serving as a guide mechanism and a linear motor are separately provided. There are proposed various actuators, in which such a linear motor is incorporated in a table, etc.

However, since it is required that a linear guide and a linear motor in the actuators described above be provided separately in a vertical direction as shown in, for example, FIGS. 23 and 24, the actuators are generally made large in size and encounter a difficulty in miniaturization. Also, moment in a heightwise direction is generated due to a distance H between centers of balls interposed between a linear guide block and a linear guide rail and a center of a linear motor, so that a needle, a table, and the like undergo postural change to be difficult to move with accuracy.

Also, even when a linear motor is arranged centrally between two linear guide blocks independent of the linear motor so as not to be influenced by moment, a width, over which guiding is effected, is increased in a direction of movement of a needle, a table, etc., so that designing of a narrow guide is not possible, straightness is bad, and movement with high accuracy is also difficult. In addition, as shown in FIGS. 23 and 24, with a linear guide, which makes use of, for example, static-pressure guides instead of a linear guide making use of balls, designing of a narrow guide is also difficult and movement with high accuracy is difficult.

In this manner, it is difficult to make miniaturization as a whole and designing of a narrow guide compatible with each other.

SUMMARY OF THE INVENTION

The invention has been thought of in view of such situation and has its object to provide an actuator capable of achieving miniaturization and high accuracy in movement and a table device provided with the actuator.

The invention provides the following measures in order to solve the problems.

The invention provides an actuator comprising a linear motor having a stationary shaft extending in a predetermined direction, and a needle movable along the stationary shaft, one of the stationary shaft and the needle having a magnet, and the other of the stationary shaft and the needle having a coil, a guide rail extending in parallel to the stationary shaft and interposing the needle inside to guide the same, and support means interposed between the guide rail and the needle to movably support the needle, and the support means is provided coaxial with an axis of the stationary shaft.

With the actuator according to the invention, when the linear motor is actuated, that is, the needle is moved along the stationary shaft, the needle moves along the guide rail through the support means. That is, the needle has the function as a linear motor and the function as a guide mechanism such as a linear guide. Conventionally, for example, a guide member such as guide block, or the like is mounted to a needle and the guide member is guided by a guide rail, while the guide rail in the invention guides the needle itself as described above. Accordingly, it is possible to make design generally compact and to achieve miniaturization and lightening.

Also, since the guide rail interposes the needle inside to guide the same, that width, over which the support means supports the needle, can be made small. That is, the width can be decreased relative to a direction of movement of the needle and a narrow guide can be designed, so that it is possible to move the needle with high accuracy.

Further, since the support means is provided coaxial with an axis of the stationary shaft, it is possible to suppress action of moment load on the needle when the needle moves along the stationary shaft. Accordingly, it is possible to achieve high accuracy in movement.

Also, the invention provides an actuator comprising a linear motor having a stationary shaft extending in a predetermined direction, and a needle movable along the stationary shaft, one of the stationary shaft and the needle having a magnet, and the other of the stationary shaft and the needle having a coil, a guide rail extending in parallel to the stationary shaft and interposing the needle inside to guide the same, and support means interposed between the guide rail and the needle to movably support the needle, and wherein a point of action of the support means and an axis of the stationary shaft are consistent with each other.

With the actuator according to the invention, when the linear motor is actuated, that is, the needle is moved along the stationary shaft, the needle moves along the guide rail through the support means. That is, the needle has the function as a linear motor and the function as a guide mechanism such as a linear guide. Conventionally, for example, a guide member such as guide block, or the like is mounted to a needle and the guide member is guided by a guide rail, while the guide rail in the invention guides the needle itself as described above. Accordingly, it is possible to make design generally compact and to achieve miniaturization and lightening.

Also, since the guide rail interposes the needle inside to guide the same, that width, over which the support means supports the needle, can be made small. That is, the width can be decreased relative to a direction of movement of the needle and a narrow guide can be designed, so that it is possible to move the needle with high accuracy.

Further, since the stationary shaft and the support means are arranged such that a point of action of the support means and an axis of the stationary shaft are consistent with each other, it is possible to suppress action of moment load on the needle when the needle moves along the stationary shaft. Accordingly, it is possible to achieve high accuracy in movement.

Also, the actuator according to the invention adds to the actuator according to the above invention a feature in that the support means is provided in pair, and wherein a distance between a point, at which one of the support means acts on the needle, and the axis of the stationary shaft and a distance between a point, at which the other of the support means acts on the needle, and the axis of the stationary shaft are consistent with each other, and a plane passing through the both points of action is consistent with the axis of the stationary shaft.

With the actuator according to the invention, since a distance between a point, at which one of the support means acts on the needle, and the axis of the stationary shaft and a distance between a point, at which the other of the support means acts on the needle, and the axis of the stationary shaft are consistent with each other, the axis of the stator can be arranged midway (midway in a widthwise direction) the points of action of the pair of support means. Thereby, since the construction is according to the principle of a narrow guide, generation of a moment load on the needle by thrust of the linear motor is suppressed, so that the needle can be moved while being restricted in postural change, and accuracy in straight movement can be enhanced. Accordingly, it is possible to achieve high accuracy in movement.

Also, since a plane passing through the both points of action of the pair of support means is consistent with the axis of the stationary shaft, that is, the axis of the stator and the points of action of support means are substantially the same in a heightwise direction, any moment in the heightwise direction disappears, and the needle is restricted in postural change, so that it is possible to enhance accuracy in straight movement.

Also, the invention provides an actuator comprising a linear motor having a stationary shaft extending in a predetermined direction, and a needle movable along the stationary shaft, one of the stationary shaft and the needle having a magnet, and the other of the stationary shaft and the needle having a coil, a guide rail extending in parallel to the stationary shaft and guiding the needle inside in a manner to be interposed by the needle, and support means interposed between the guide rail and the needle to movably support the needle, and wherein a point of action of the support means and an axis of the stationary shaft are consistent with each other.

With the actuator according to the invention, when the linear motor is actuated, that is, the needle is moved along the stationary shaft, the needle moves along the guide rail through the support means. That is, the needle has the function as a linear motor and the function as a guide mechanism such as a linear guide. Accordingly, it is possible to make design generally compact and to achieve miniaturization and lightening. In particular, since the guide rail guides the needle from inside, that width, over which the support means supports the needle, can be made small. That is, the width can be decreased relative to a direction of movement of the needle and a narrow guide can be designed, so that it is possible to move the needle with high accuracy.

Further, since the stationary shaft and the support means are arranged such that a point of action of the support means and an axis of the stationary shaft are consistent with each other, it is possible to suppress action of a moment load on the needle when the needle moves along the stationary shaft. Accordingly, it is possible to achieve high accuracy in movement.

Also, the actuator according to the invention adds to the actuator according to the above invention a feature in that the support means is provided in pair, and a distance between a point, at which one of the support means acts on the needle, and the axis of the stationary shaft and a distance between a point, at which the other of the support means acts on the needle, and the axis of the stationary shaft are consistent with each other.

With the actuator according to the invention, since a distance between a point, at which one of the support means acts on the needle, and the axis of the stationary shaft and a distance between a point, at which the other of the support means acts on the needle, and the axis of the stationary shaft are consistent with each other, the axis of the stator can be arranged midway (midway in a widthwise direction) the points of action of the pair of support means. Thereby, since the construction is according to the principle of a narrow guide, generation of a moment load on the needle by thrust of the linear motor is suppressed, so that the needle can be moved while being restricted in postural change, and accuracy in straight movement can be enhanced. Accordingly, it is possible to achieve high accuracy in movement.

Also, the actuator according to the invention has a feature in that the stationary shaft comprises a coil and the needle comprises a permanent magnet.

With the actuator according to the invention, since the permanent magnet is moved along the coil on a stationary side, wiring, or the like, connected to the coil is not dragged during movement. Accordingly, meeting with no resistance from the wiring, or the like, the needle can be moved more smoothly. Also, since the coil is disposed on the stationary side, measures for heating of the coil can be settled to easily suppress heating, thus enabling improving reliability.

Also, the actuator according to the invention adds to the actuator according to any one of the above inventions a feature in that the support means comprises a plurality of rolling bodies provided on surfaces of the needle in a direction along the guide rail.

With the actuator according to the invention, rolling bodies such as balls, roller chain, etc. make it possible to smoothly move the needle in the direction along the guide rail.

Also, the actuator according to the invention adds to the actuator according to any one of the above inventions a feature in that the support means comprises static-pressure pads to support guide surfaces of the guide rail on the surface of the needle, flow passages connected to the static-pressure pads, and supply means to supply a fluid at a predetermined pressure to the static-pressure pads via the flow passages.

With the actuator according to the invention, a fluid regulated at a predetermined pressure is supplied to the static-pressure pads via the flow passages by the supply means to support the guide surfaces. Thereby, a frictional force between the needle and the guide rail is decreased to enable making smooth movement. In particular, since mechanical contact between the needle and the guide rail can be prevented, it is possible to decrease vibrations, or the like, and to further achieve high accuracy in movement. Also, not relying on mechanical contact, it is possible to prevent scratch, wear, or the like, for the needle and the guide rails.

Also, the actuator according to the invention adds to the actuator according to the above invention a feature in that the flow passages are provided in the needle.

With the actuator according to the invention, since the flow passages are moved simultaneously as the needle moves, the guide surfaces can be constantly supported irrespective of movement (stroke) of the needle. Accordingly, since designing can be made without caring for stroke, it can be enhanced in degree of freedom.

Also, the actuator according to the invention adds to the actuator according to the above invention a feature in that the flow passages are provided in the stationary shaft and the guide rail.

With the actuator according to the invention, since the flow passages such as piping or the like are provided on a stationary side such as guide rails or the like, the flow passages are not moved together with the needle. Accordingly, there is no need for any flow passages from the stationary side to a moving side, and there is no need of providing any expandable and contractible piping hoses midway the flow passages. Therefore, no reaction forces are generated due to extension and contraction of such piping hoses or the like, and the needle is not exerted by any surplus external force.

Further, by fixing the flow passages, it is not necessary to ensure lengths of the flow passages required for movement of the needle and to use any expandable and contractible hoses or the like, so that piping can be shortened and the flow passages can be made hard whereby it is possible to decrease loss in pressure and flow rate and to surely supply a fluid to the static-pressure pads.

Also, the table device according to the invention has a feature in comprising the actuator according to any one of the above inventions, and a table fixed to the needle.

With the table device according to the invention, it is possible to achieve miniaturization and lightening and to move the table with high accuracy.

With the actuator and the table device according to the invention, it is possible to achieve miniaturization and lightening and to move the actuator and the table device with high accuracy.

BRIEF DESCRIPTION OF THE DRAWINGS

FIG. 9 is a front view showing a third embodiment of an actuator according to the invention and a table device, according to the invention, provided with the actuator;

FIG. 10 is a side view showing the table device of FIG. 9;

FIG. 14 is a cross sectional view taken along the line F-F and showing the table device of FIG. 12;

FIG. 15 is a cross sectional view taken along the line G-G and showing the table device of FIG. 13;

FIG. 16 is a front view showing a fourth embodiment of an actuator according to the invention and a table device, according to the invention, provided with the actuator;

FIG. 17 is a side view showing the actuator of FIG. 16;

FIG. 19 is a cross sectional view taken along the line H-H and showing the table device of FIG. 18;

FIG. 20 is a cross sectional view taken along the line J-J and showing the table device of FIG. 19;

DESCRIPTION OF THE PREFERRED EMBODIMENTS

Figure 1:
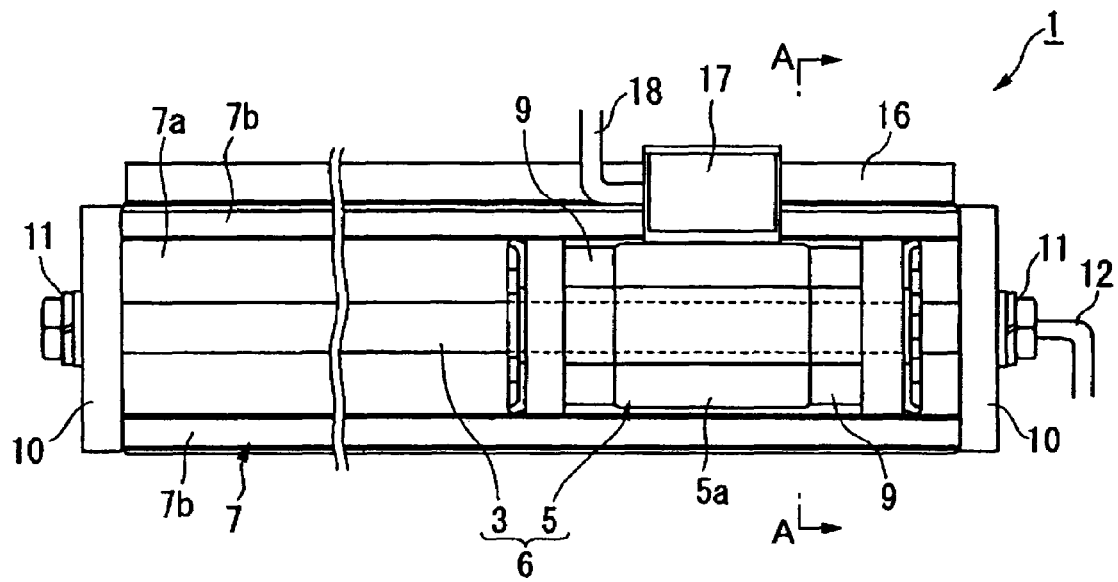
FIG. 1 is a plan view showing a first embodiment of an actuator according to the invention.

A first embodiment of an actuator according to the invention will be described below with reference to FIGS. 1 to 6.

An actuator 1 according to the invention comprises, as shown in FIGS. 1 to 5, a stator (stationary shaft) 3 having a coil 2 extending in a predetermined direction, a linear motor 6 having a needle 5 having a permanent magnet (magnet) 4, which is movable along the stator 3, a guide rail 7 extending in parallel to the stator 3 and interposing the needle 5 inside to guide the same, and a pair of support means 8 interposed between the guide rail 7 and the needle 5 to movably support the needle 5.

Also, the actuator 1 according to the embodiment is constructed such that points of action of the pair of support means 8 and an axis of the stator 3 are consistent with each other, that is, a distance between a point, at which one of the support means 8 acts on the needle 5, and the axis of the stator 3 and a distance between a point, at which the other of the support means 8 acts on the needle 5, and the axis of the stator 3 are consistent with each other, and a plane passing through the both points of action of the pair of support means 8 is consistent with the axis of the stator 3. This will be described later in detail.

In addition, the linear motor 6 constituting the actuator 1 according to the embodiment is described as a rod type that moves linearly.

Figure 2:
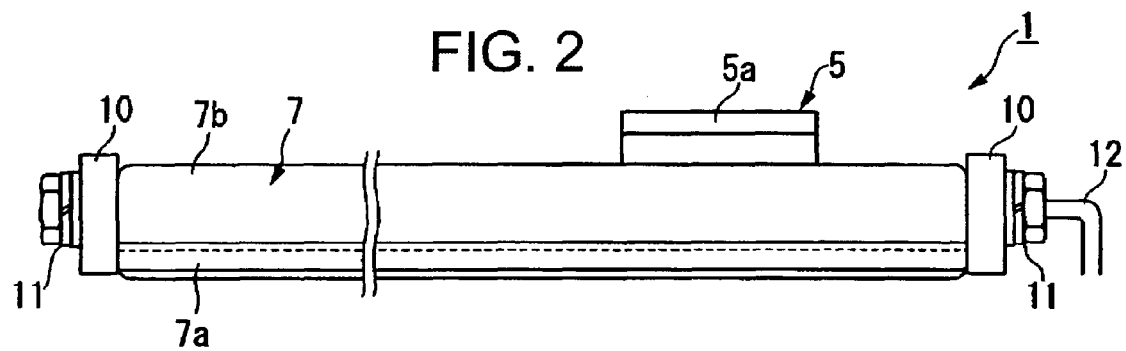
FIG. 2 is a side view showing the actuator of FIG. 1.
Figure 4A:
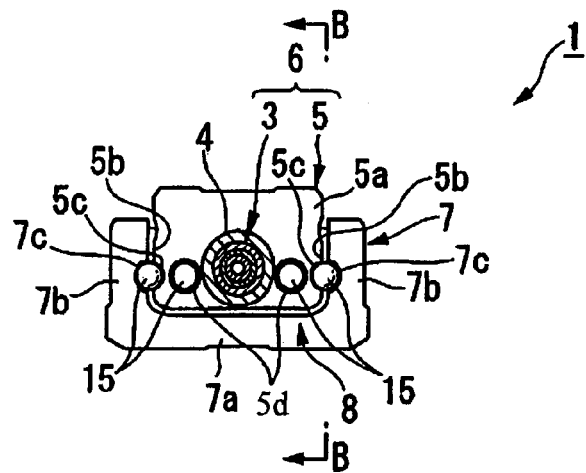
FIG. 4A is a cross sectional view taken along the line A-A and showing the actuator of FIG. 1
Figure 4B:
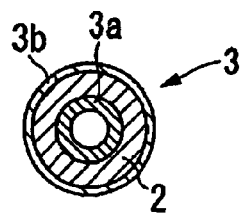
FIG. 4B is a cross sectional view showing a stator.

As shown in FIG. 4B, the stator 3 is made cylindrical by a center pipe 3a formed to assume a shape of a hollow shaft, the coil 2 mounted to surround a periphery of the center pipe 3a, and an outer pipe 3b in the form of a metallic member made of stainless steel, or the like and mounted to surround a periphery of the coil 2. As shown in FIGS. 1 and 2, the stator 3 is fixed to end plates 10 by joint members 11 such as washers, bolts, or the like with both ends thereof interposed between the end plates 10. Also, a length of cable 12 connected to a control unit (not shown) is connected to the coil 2 at this time. Also, the center pipe 3a has a pipe line connected thereto to afford supplying a fluid, for example, liquids such as oil, or the like, and gases such air, or the like, into a hollow portion.

Also, the guide rail 7 is interposed and fixed between the end plates 10 in the same manner as the stator 3 is. The guide rail 7 is formed by a bottom surface 7a opened upward and wall portions 7b bent upward from both ends of the bottom surface 7a to be made substantially C-shaped in cross section as shown in FIG. 4A.

As shown in FIG. 4A, the permanent magnet 4 has a predetermined length in an axial direction of the stator 3 and is formed to be cylindrical-shaped in a manner to cover the stator 3. Also, the needle 5 comprises the permanent magnet 4 and a rectangular block 5a fixed to the permanent magnet 4 in a manner to cover the permanent magnet 4. The block 5a is set in widthwise dimension in a manner to be fitted inside the guide rail 7, that is, between the both wall portions 7b, and set in heightwise dimension in a manner to project above the both wall portions 7b. In addition, as shown in FIG. 4A, a center (axis) of the needle 5 in a widthwise direction and a center (axis) of the stator 3 are consistent with each other.

Figure 5:
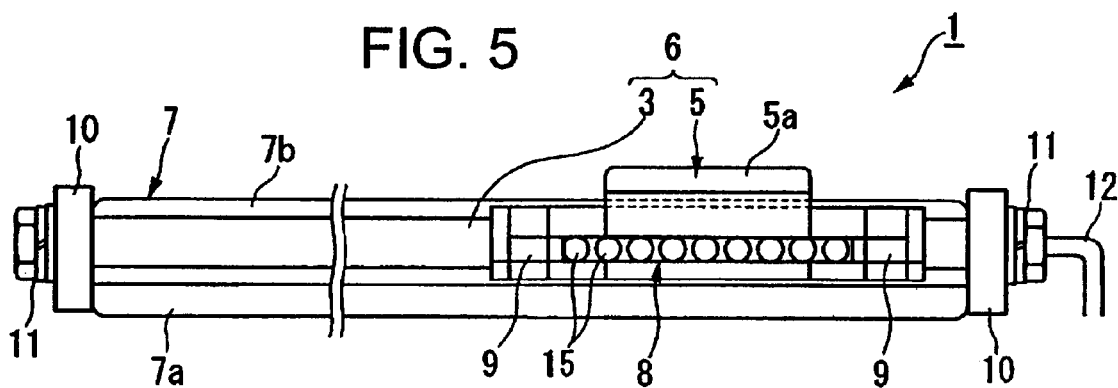
FIG. 5 is a cross sectional view taken along the line B-B and showing the actuator of FIG. 4A.

As shown in FIGS. 4 and 5, the pair of support means 8 comprise a plurality of balls (rolling bodies) 15 provided on surfaces of the needle 5, that is, surfaces 5b of the block 5a opposed to the both wall portions 7b in a direction along the guide rail 7. The respective balls 15 roll in a state, in which they are interposed between guide grooves 5c, 7c formed on the opposed surfaces 5b of the block 5a and surfaces (opposed to the needle 5) of the both wall portions 7b. The guide grooves 5c, 7c are formed axially of the guide rail 7 and have a cross sectional shape of Gothic arch type, in which two arcs are combined together. Thereby, the balls 15 come into two-point contact with the respective guide grooves 5c, 7c, that is, into four-point contact with the both guide grooves 5c, 7c to be able to bear loads in four, that is, upper, lower, right and left directions when rolling. Accordingly, the respective balls 15 are smoothly moved axially of the guide rail 7 without rattling.

Also, the balls 15 roll on the guide rail 7 while being guided by the both guide grooves 5c, 7c, and then picked up by end caps 9, which are mounted integrally to both ends of the block 5a, in a manner to separate from the guide rail 7 to be fed into through-holes 5d formed inside the block 5a. In addition, the through-holes 5d are formed in positions adjacent to and of substantially the same level as the guide grooves 5c to be sized to permit passage of the balls 15 therethrough. Also, the balls 15 fed into the through-holes 5d are fed again between the both guide grooves 5c, 7c by the end caps 9. That is, when the needle 5 moves along the guide rail 7, the plurality of balls 15 roll while circulating between the both guide grooves 5c, 7c and the through-holes 5d. The both guide grooves 5c, 7c and the through-holes 5d are also a part that constitutes the pair of support means 8.

Also, according to the embodiment, one of the support means 8 is disposed on a right side and the other of the support means 8 is disposed on a left side with the stator 3 therebetween as shown in FIG. 4. Also, the stator 3 and the pair of support means 8 are positionally related to each other such that a distance between a point, at which one of the support means 8 acts, that is, at which a resultant force of forces acted on the needle 5 through the guide grooves 5c by the balls 15 in two-point contact acts, and the axis of the stator 3 is consistent with a distance between a point, at which the other of the support means 8 acts, and the axis of the stator 3, are consistent with each other. That is, the axis of the stator 3 is positioned to be intermediate between the balls 15 on both sides in a widthwise direction. Further, a plane passing through the both points of action of the pair of support means 8 is consistent with the axis of the stator 3. That is, the axis of the stator 3 is consistent with a height of the points of action.

Figure 3:
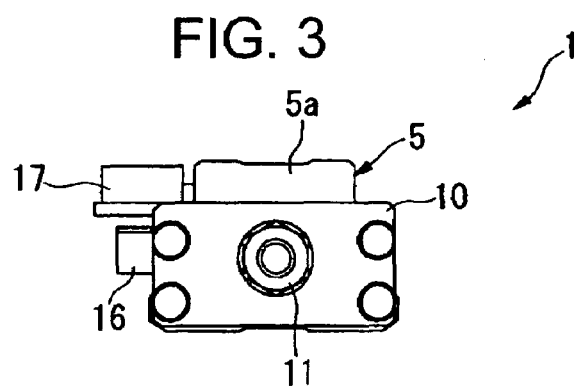
FIG. 3 is a front view showing the actuator of FIG. 1.

Also, a linear-sensor scale 16 is mounted outside one of the wall portions 7b of the guide rail 7 along an axial direction as shown in FIG. 3. Also, a linear sensor 17 is mounted on an upper side (a side in a position, which projects above the wall portions 7b) of the needle 5 in a manner to be opposed to the linear-sensor scale 16, the linear sensor being connected to a control unit (not shown) via a length of cable 18. Thereby, axial movement of the needle 5 relative to the guide rail 7 can be measured.

An explanation will be described below with respect to the case where the actuator 1 constructed in this manner is actuated.

When current is carried to the coil 2 by the control unit, magnetic flux acting between the permanent magnet 4 and the coil generates a driving force, by which the permanent magnet 4 is moved axially of the stator 3, that is, the needle 5 is moved through the medium of the pair of support means 8 along the guide rail 7. In addition, the direction of movement is set by a direction, in which current is carried to the coil 2. At this time, since the linear motor 6 according to the embodiment is of a rod type, that is, the permanent magnet 4 covers the circumference of the coil 2, it is possible to efficiently convert magnetic flux into a driving force.

In this manner, the needle 5 has the function as the linear motor 6 and the function as a guide mechanism such as a linear guide. Thereby, the guide rail 7 can guide the needle 5 itself, so that it can be designed compact as compared with conventional ones to achieve miniaturization and lightening.

Also, when the needle 5 is moved, the balls 15 together with the needle 5 roll while circulating between the both guide grooves 5c, 7c and the through-holes 5d. Thereby, the needle 5 smoothly moves along the guide grooves 5c, 7c axially of the guide rail 7. At this time, by virtue of an endless track type, in which the balls 15 circulate between the both guide grooves 5c, 7c and the through-holes 5d, the needle 5 can be constantly supported under the same condition irrespective to movement of the needle 5. Accordingly, even in the case where the needle 5 is large in stroke (movement), the needle 5 can be surely and smoothly moved. In addition, movement of the needle 5 is measured by the linear-sensor scale 16 and the linear sensor 17 to be forwarded to the control unit.

Also, since the guide rail 7 interposes the needle 5 inside to guide the same, that width, over which the pair of support means 8 support the needle 5, can be made as small as possible to design a narrow guide. Accordingly, the needle 5 is improved in straightness to enable achieving high accuracy.

Further, since the axis of the stator 3 and the points of action of the pair of support means 8 are substantially the same in a heightwise direction, any moment in the heightwise direction disappears, the needle 5 is restricted in postural change, and accuracy in straight movement is enhanced.

Further, since the axis of the stator 3 is positioned midway between the balls 15 on the both sides also in a widthwise direction, generation of a moment load on the needle 5 by thrust of the linear motor 6 is suppressed, so that the needle 5 can be moved while being restricted in postural change, and accuracy in straight movement can be enhanced.

Also, since the coil 2 having the cable 12 is disposed on a stationary side and the permanent magnet 4 is disposed on a moving side, the cable 12 such as wiring, or the like is not dragged when the needle 5 moves. Accordingly, the needle 5 can be moved more accurately without meeting with resistance from the cable 12.

Further, since the coil 2 is disposed on the stationary side, measures for heating of the coil 2 can be settled to easily suppress heating, thus enabling improving reliability. In particular, heating of the coil 2 can be further suppressed and reliability can be improved by supplying a cooling fluid into the center pipe 3a of the stator 3 from a pipe line.

As described above, with the actuator 1 according to the invention, miniaturization and lightening can be achieved and the needle 5 can be moved with high accuracy by having the needle 5 having the function as a linear motor and the function as a guide mechanism such as a linear guide. In addition, in the case where a table (not shown) is fixed to the needle 5 to make a table device of the invention, the table can be moved with high accuracy.

In addition, a ball retainer, such as a retainer or the like, to connect the respective balls 15 in a manner to eliminate contact therebetween may be provided in the embodiment. By doing this, the balls 15 can be rolled more smoothly in a state of less noise.

Also, while the embodiment adopts the support means 8 comprising the plurality of balls 15 as rolling bodies arranged on the surfaces of the needle 5 along the guide rail 7, it is not limited thereto but rollers may be used as rolling bodies.

Figure 6:
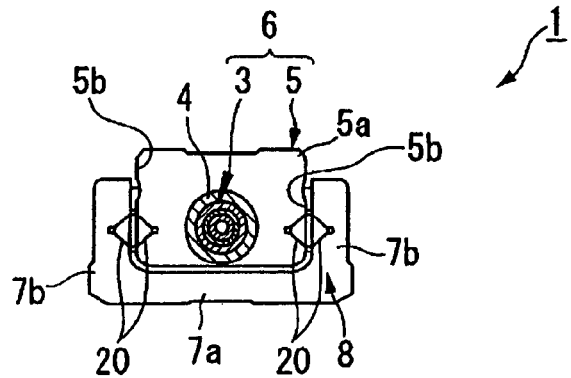
FIG. 6 is a cross sectional view showing a modification of an actuator according to a first embodiment.

Also, while an endless track type arrangement with rolling bodies circulating is adopted, in which the rolling bodies are again fed onto the surfaces of the needle 5 through the through-holes 5d of the needle 5 from the end caps 9, a limited track type arrangement without circulation of rolling bodies inside the needle may be adopted, in which a length of cross roller chain 20 is provided as rolling bodies as shown in FIG. 6. The cross roller chain 20 comprises a plurality of cylindrical rollers mounted on a plate at predetermined intervals in a direction along the guide rail 7, the rollers being able to roll in the direction along the guide rail 7.

Also, while the embodiment adopts two rows of rolling bodies, it is not limited thereto but may adopt multiple rows such as four rows, six rows, or the like.

Figure 7:
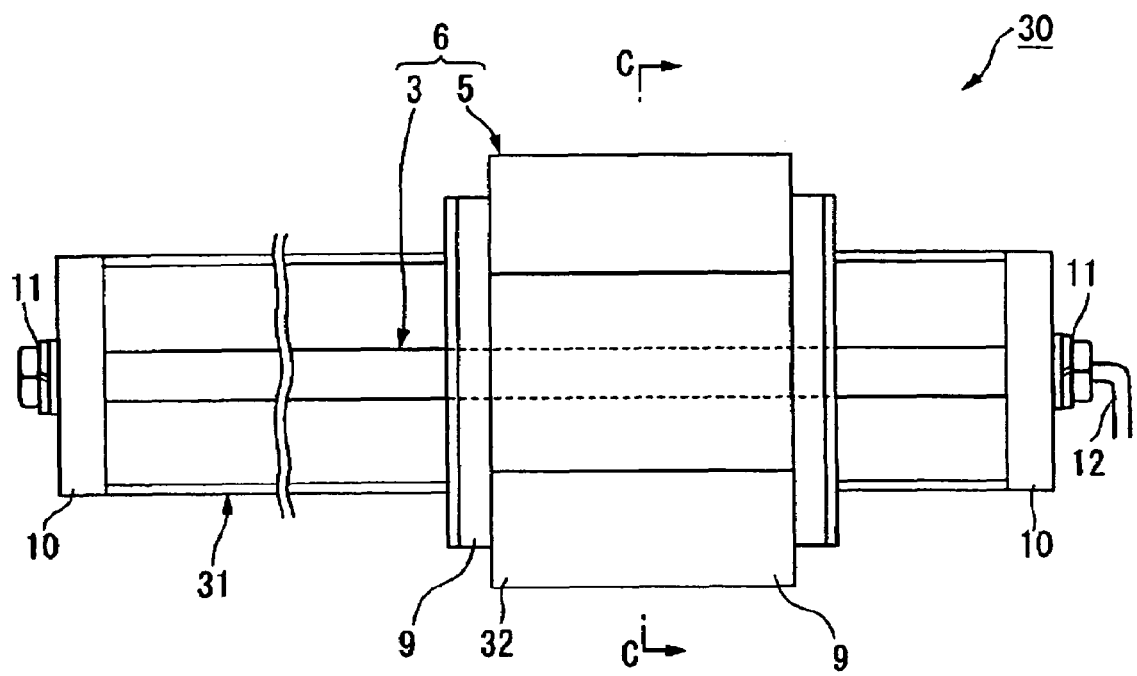
FIG. 7 is a plan view showing a second embodiment of an actuator according to the invention.

Subsequently, a second embodiment of an actuator according to the invention will be described below with reference to FIGS. 7 and 8. In addition, the same constituents of the second embodiment as those of the first embodiment are denoted by the same reference numerals and an explanation therefor is omitted.

Figure 8:
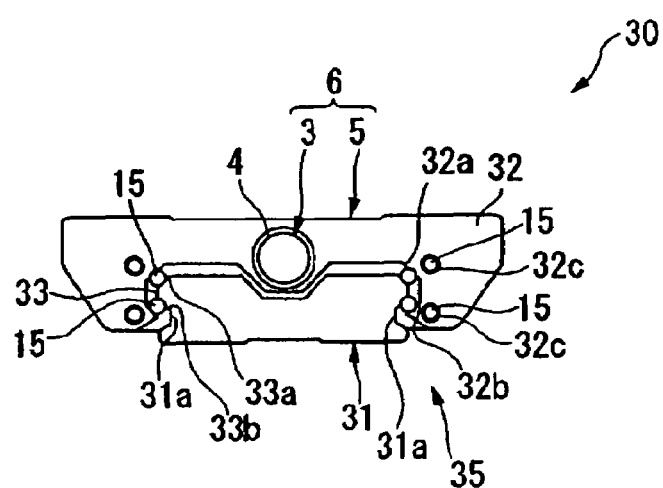
FIG. 8 is a cross sectional view taken along the line C-C and showing the actuator of FIG. 7.

The second embodiment is different from the first embodiment in that while the guide rail 7 in the first embodiment is formed to be substantially C-shaped in cross section to interpose the needle 5 therebetween, an actuator 30 in the second embodiment comprises, as shown in FIG. 8, a needle 5 comprising a block 32 formed to be substantially C-shaped in cross section to interpose a guide rail 31 therebetween. That is, the guide rail 31 guides the needle 5 from inside thereof in a manner to be interposed by the needle 5.

Grooves 31a are formed on both sides of the guide rail 31 in the embodiment to be directed axially of the guide rail 31 whereby there are provided projections 33 projecting toward the block 32 of the needle 5 and having a first slope 33a and a second slope 33b. In addition, the first slope 33a is formed to be directed upward at approximately 45 degrees and the second slope 33b is formed to be directed downward at approximately 45 degrees.

The block 32 is substantially C-shaped in cross section as described above and formed along the profile of the guide rail 31. Also, the block 32 is formed with first opposed surfaces 32a and second opposed surfaces 32b, which are positioned to be opposed to the first slopes 33a and the second slopes 33b. Also, according to the embodiment, balls 15 are arranged to be positioned between the first slopes 33a and the first opposed surfaces 32a and between the second slopes 33b and the second opposed surfaces 32b. That is, the balls 15 are arranged such that a contact angle is 45 degrees upward or 45 degrees downward. Also, the balls 15 can circulate through through-holes 32c formed in respective positions inside the block 32 and about the first opposed surfaces 32a and the second opposed surfaces 32b in the same manner as in the first embodiment. Support means 35 is constituted by the balls 15, the through-holes 32c, the first opposed surfaces 32a and the second opposed surfaces 32b, and the first slopes 33a and the second slopes 33b.

In addition, the balls 15 in the embodiment are supported in an angular contact type. Also, like the first embodiment, the embodiment is constituted such that the axis of the stator 3 and the both points of action of the pair of support means 35 are substantially the same in a heightwise direction.

In addition to the same function and effect as those in the actuator 1 according to the first embodiment, the actuator 30 constructed in this manner enables moving the needle 5 more stably since the balls 15 arranged between the guide rail 31 and the needle 5 are increased in number. In particular, since the balls 15 movably support the needle 5 at approximately 45 degrees upward and at 45 degrees downward from right and left sides in an angular contact type manner, any one or ones of the balls 15 bear a load even when an upward load, torsion, or the like acts on the needle 5, so that postural change caused by an external load can be restricted and thus reliability is enhanced.

In addition, while the embodiment is constructed such that a contact angle of the balls 15 corresponds to substantially 45 degrees, it is not limited thereto but the contact angle may be whatever one provided that it is one affording supporting the needle 5. Also, while a contact type of the balls 15 in the embodiment is an angular contact type, a four-point contact type according to the Gothic arch type will do.

Also, the actuator 30 according to the embodiment can move a table with high accuracy in the same manner as in the actuator 1 according to the first embodiment in the case where a table (not shown) is fixed to the needle 5 to make a table device of the invention.

Subsequently, a third embodiment of an actuator according to the invention will be described below with reference to FIGS. 9 to 15. In addition, the same constituents of the third embodiment as those of the first embodiment are denoted by the same reference numerals and an explanation therefor is omitted.

The third embodiment is different from the first embodiment in that while the support means 8 in the first embodiment movably supports the needle 5 by means of the balls 15, an actuator 40 according to the third embodiment comprises support means 41 composed of a static-pressure guide that makes use of a fluid.

In addition, the actuator 40 according to the third embodiment is a part that constitutes a table device 60 of the invention.

A table device 60 according to the embodiment comprises, as shown in FIG. 15, a table 61 and a base 62, on an upper surface of which base are placed guide rails 42 of the actuator 40 with a needle 43 therebetween.

The guide rails 42 are formed on upper sides thereof with outward projections 42a. In addition, the guide rails 42 according to the embodiment function as a stationary side of the static-pressure guide.

The needle 43 is arranged between the guide rails 42 and comprises a block 44 formed to be substantially rectangular parallelopiped. In addition, a center of the stator 3 and a center of the needle 43 are consistent with each other. Also, the table 61 is fixed to an upper surface of the needle 43.

The table 61 is formed to be substantially C-shaped in cross section to comprise downwardly bent walls 61a on both sides thereof. Also, the walls 61a are positioned outside the guide rails 42 and formed such that tip ends thereof are at the same level as that of lower surfaces of the projections 42a. Further, mounted to the tip ends of the walls 61a are static-pressure guide 63 positioned between the lower surfaces of the projections 42a and the upper surface of the base 62.

Also, a linear-sensor scale 45 is mounted to a side of the table 61, and a linear sensor 46 is mounted through a sensor base 65, which is provided upright on a side of the base 62, in a manner to be opposed to the linear-sensor scale 45.

The support means 41 comprises first static-pressure pads (static-pressure pads) 51 having a first recess 50, which supports a guide surface of the guide rail 42 on the surface of the needle 43, first pipe lines (flow passages) 52 connected to the first static-pressure pads 51, and supply means 53, which supplies a fluid at a predetermined pressure and a predetermined flow rate to the first static-pressure pads 51 via the first pipe lines 52.

The first recesses 50 are formed, as shown in FIGS. 14 and 15, on surfaces of the needle 43, that is, surfaces opposed to the guide rails 42 of the block 44 to extend in a direction along the guide rails 42 to be substantially elliptical-shaped. Also, as shown in FIG. 14, areas except the first recesses 50 constitute first lands 50a, and the first static-pressure pads 51 are constituted by the first lands 50a and the first recesses 50. In addition, the first static-pressure pads 51 in the embodiment are formed two on one side, that is, four in total on both sides.

Also, as shown in FIG. 14, recovery grooves 59a connected to recovery passages 59 described later are formed between the first static-pressure pads 51 to be disposed in lower positions than the surface of the first lands (land surfaces) 50a. Thereby, a fluid, which overflows from the first lands 50a, can flow to the recovery passages 59 via the recovery grooves 59a.

The first pipe lines 52 are provided inside the needle 43. More specifically, as shown in FIG. 15, the first pipe lines are connected at one ends thereof to substantially centers of the first recesses 50 and at the other ends thereof to common pipe lines 54 on the upper surface of the table 61 through the table 61.

Figure 11:
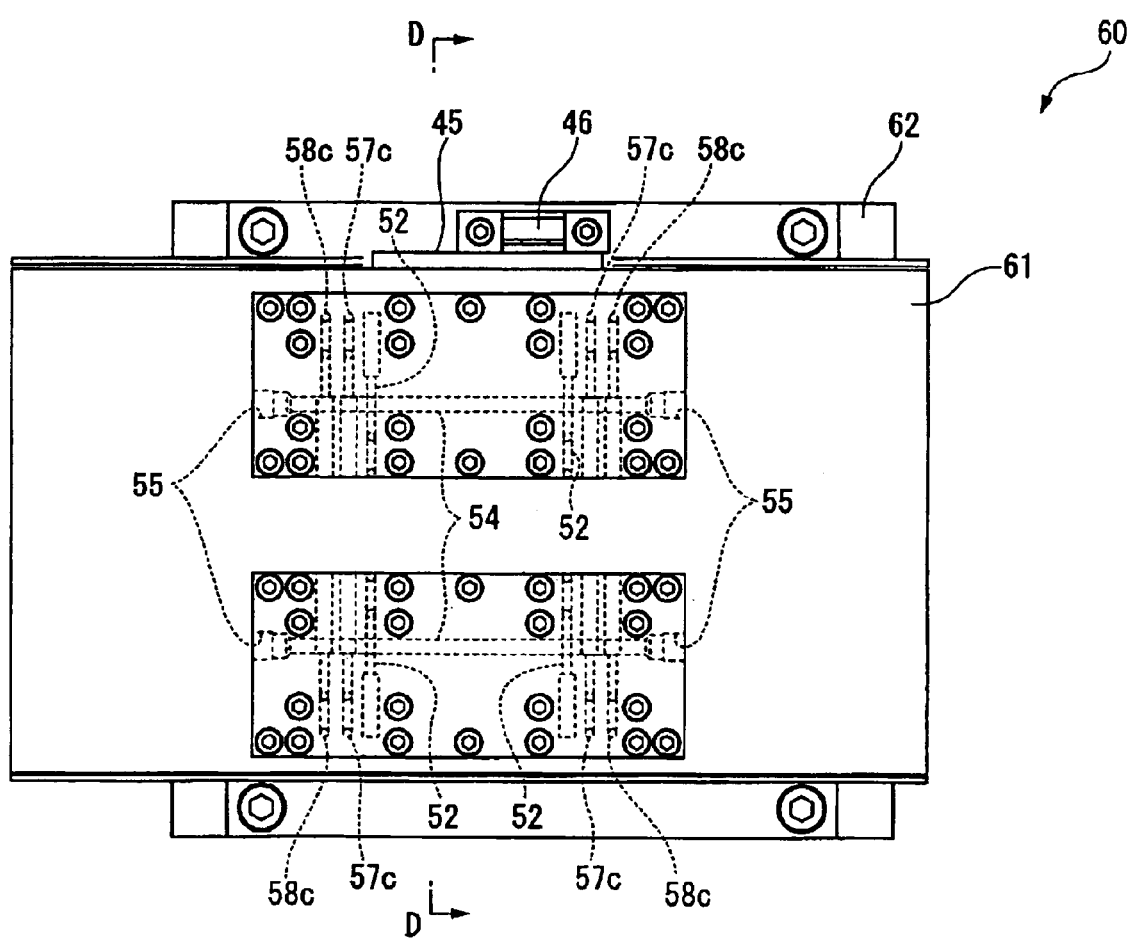
FIG. 11 is a plan view showing the table device of FIG. 10.

The common pipe lines 54 are connected, as shown in FIGS. 9 to 11, to those connection ports 55 on the upper surface of the table 61, which are connectable to a fluid supply source for supplying of a fluid such as air, or the like. Also, static-pressure restrictions 56, such as tapered restrictions, which restrict fluid flow rates, or the like, are provided in the first pipe lines 52 to afford supplying of a fluid to the first static-pressure pads 51 at a predetermined pressure and a predetermined flow rate. The connection ports 55, the fluid supply source, and the static-pressure restrictions 56 constitute the supply means 53.

In addition, the first pipe line 52 and the supply means 53, respectively, are provided on the respective first static-pressure pads 51. Also, like the first embodiment, the guide rail 42 according to the embodiment interposes the needle 43 inside to guide the same and a distance between a point, at which one of the support means 41 acts, that is, those surfaces of the first static-pressure pads 51, which act on guide surfaces of the guide rail 42, and the axis of the stator 3 is consistent with a distance between a point, at which the other of the support means 41 acts, and the axis of the stator 3. That is, the axis of the stator 3 is positioned midway between the both support means 41 in a widthwise direction. Further, the axis of the stator 3 and a center of the support means 41, that is, a center of the first static-pressure pads 51 are consistent with each other in the same manner as in the first embodiment.

Also, like the first static-pressure pads 51, second static-pressure pads (static-pressure pads) 57 are arranged between upper surfaces of the static-pressure guides 63 and lower surfaces of the projections 42, and third static-pressure pads (static-pressure pads) 58 are arranged between lower surfaces of the static-pressure guides 63 and an upper surface of the base 62.

Figure 13:
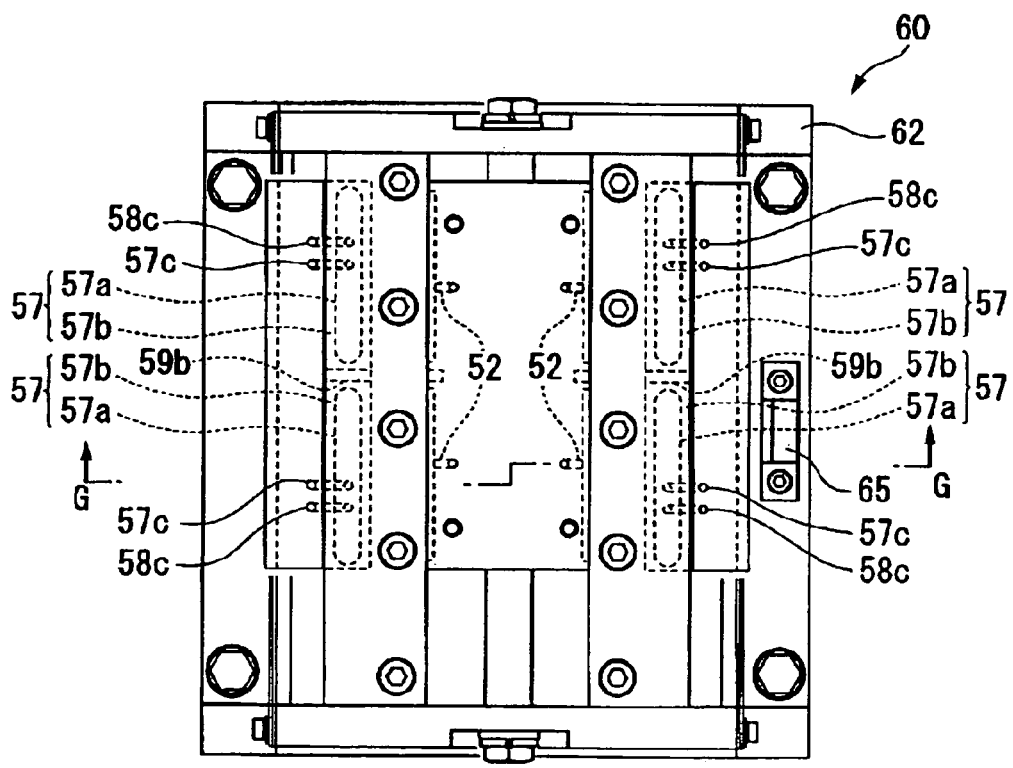
FIG. 13 is a cross sectional view taken along the line E-E and showing the table device of FIG. 12.
Figure 18:
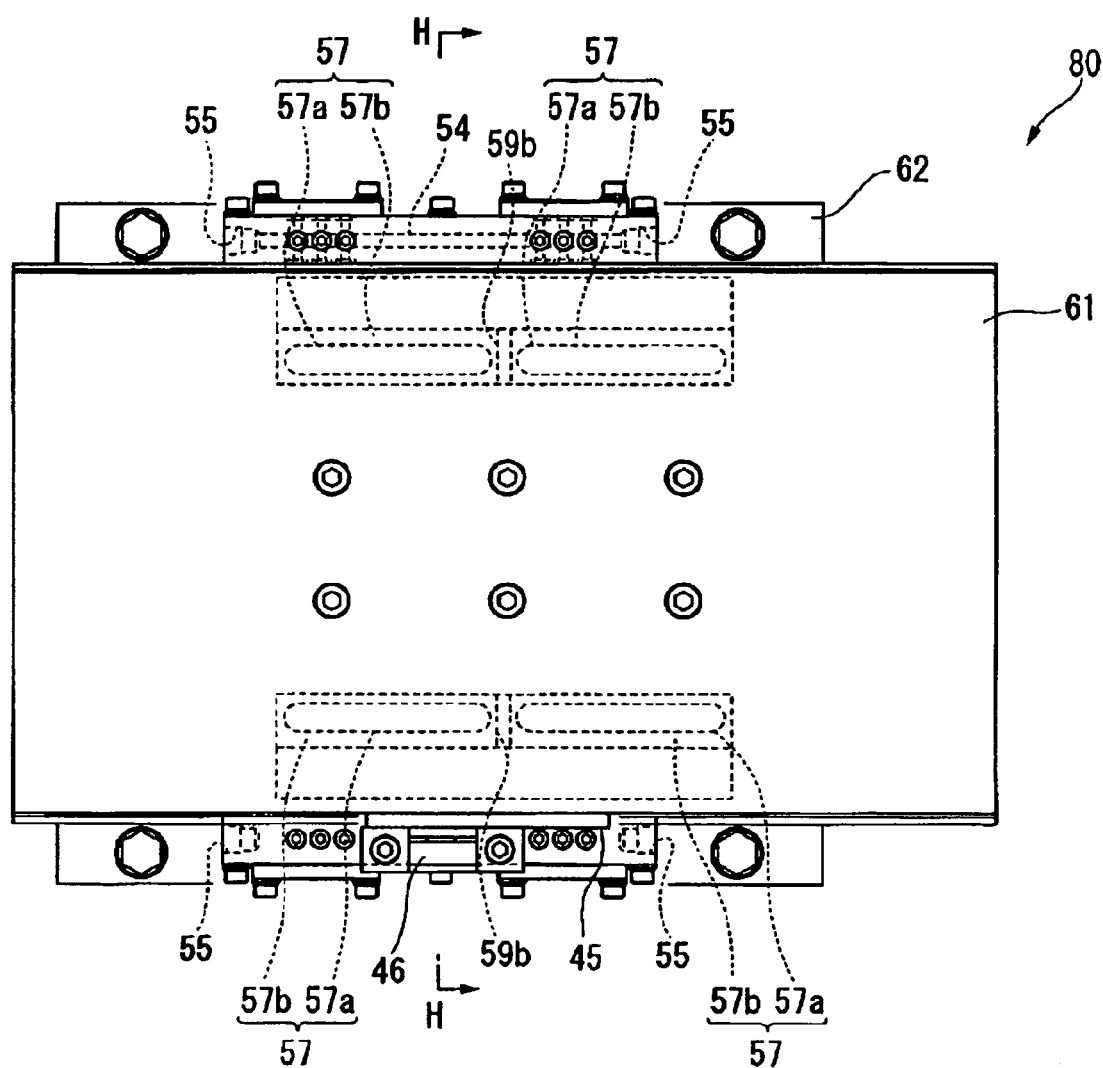
FIG. 18 is a plan view showing the table device of FIG. 16.
Figure 21:
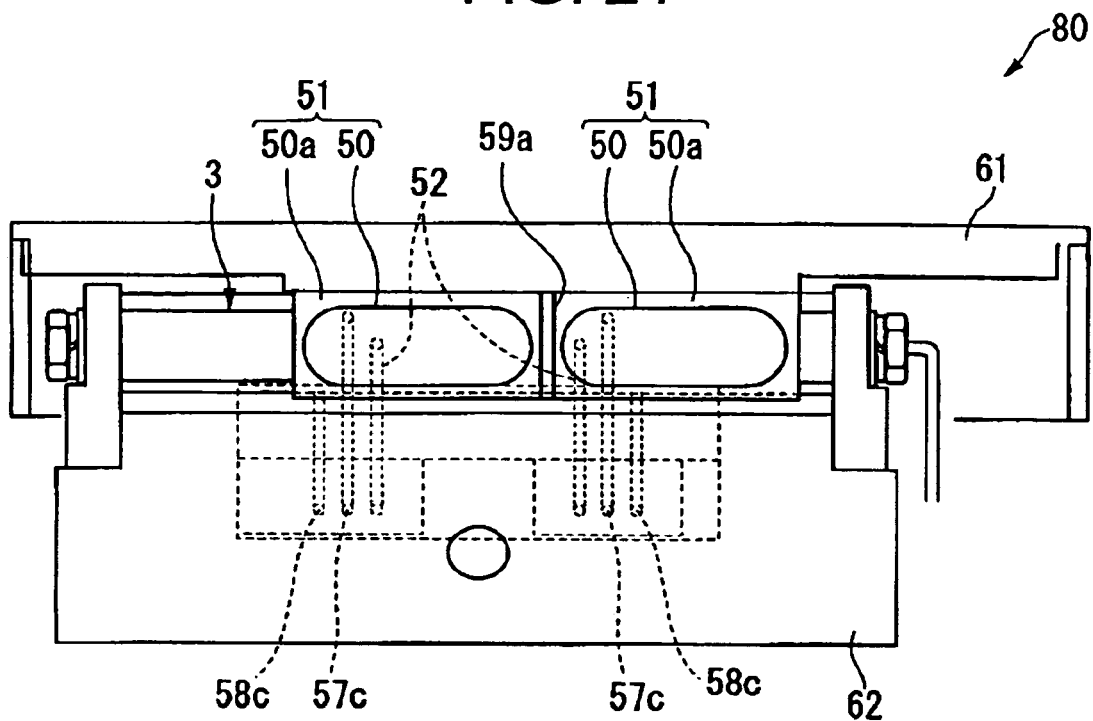
FIG. 21 is a cross sectional view taken along the line K-K and showing the table device of FIG. 19.

Like the first static-pressure pads 51, the second static-pressure pads 57 comprise, as shown in FIG. 13, a second recess 57a, which extends in a direction along the guide rails 42 and is formed to be substantially elliptical-shaped, and a second land 57b. Likewise, the third static-pressure pads 58 comprise, as shown in FIG. 15, a third recess 58a, which extends in the direction along the guide rails 42 and is formed to be substantially elliptical-shaped, and a third land (not shown).

In addition, the second static-pressure pads 57 and the third static-pressure pads 58 are formed two on one side, that is, four in total on both sides in the same manner as in the first static-pressure pads 51. Also, as shown in FIG. 13, recovery grooves 59b connected to the recovery passages 59 described later are formed between the second static-pressure pads 57 to be disposed in lower positions than the surfaces (land surfaces) of the second lands 57b, so that a fluid, which overflows from the second lands 57b, can flow to the recovery passages 59 via the recovery grooves 59b. Recovery grooves (not shown) are likewise formed between the third static-pressure pads 58, so that a fluid, which overflows from the third lands, can flow to the recovery passages 59 via the recovery grooves.

Second pipe lines (flow passages) 57c and third pipe lines (flow passages) 58c are connected at one end thereof to the second static-pressure pads 57 and the third static-pressure pads 58 and at the other ends thereof to the common pipe lines 54 on the upper surface of the table 61 through the static-pressure guides 63 and the table 61. Also, static-pressure restrictions 56 are provided in the second pipe lines 57c and the third pipe lines 58c.

Also, like the first static-pressure pads 51, the second pipe-line 57c and the static-pressure restriction 56 are provided in the respective second static-pressure pads 57, and the third pipe lines 58c and the static-pressure restriction 56 are provided in the respective third static-pressure pads 58.

Figure 12:
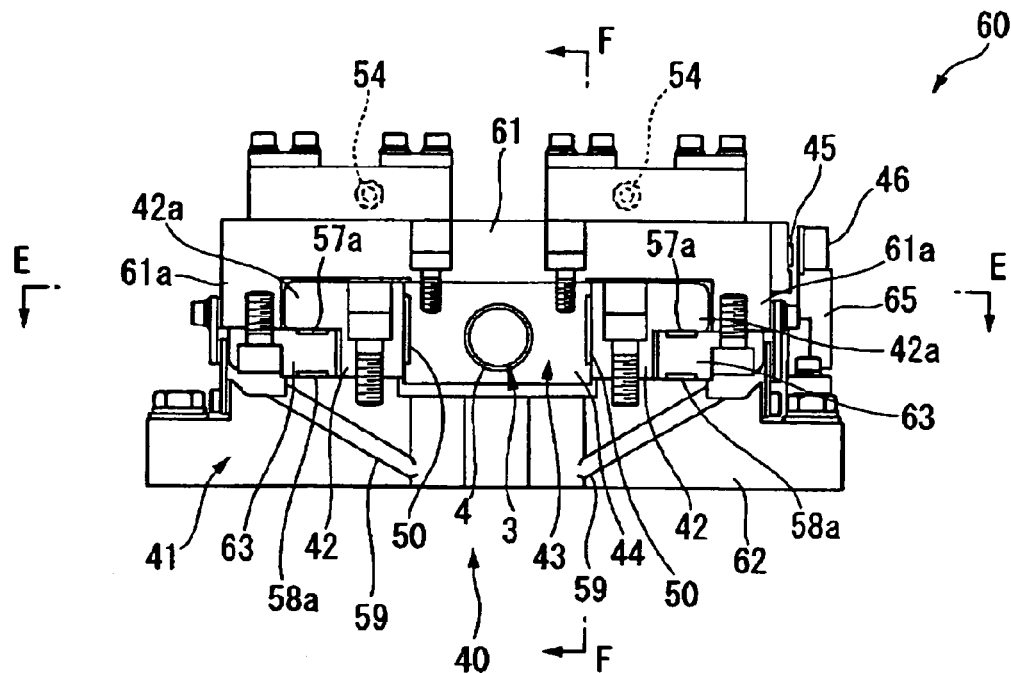
FIG. 12 is a cross sectional view taken along the line D-D and showing the table device of FIG. 11.

In addition, the respective pipe lines 52, 57c, 58c are arranged adjacent to one another. Also, formed in the base 62 as shown in FIG. 12 are the recovery passages 59, through which a fluid overflowing from the respective static-pressure pads 51, 57, 58 is conducted to a recovery tank (not shown).

With the table device 60 and the actuator 40 constructed in the above manner, a fluid regulated at a predetermined pressure and a predetermined flow rate is constantly supplied to the respective recesses 50, 57a, 58a via the respective pipe lines 52, 57c, 58c by the supply means 53. The fluid accumulated in the respective recesses 50, 57a, 58a pushes the sides and underside of the guide rails 42 and the upper surface of the base 62. That is, the fluid is put in a state of being interposed between the static-pressure guides 63, which are fixed to the needle 43 and the table 61, and the guide rails 42 and the base 62. Accordingly, when the needle 43 and the table 61 are moved, the fluid decreases frictional forces between the needle 43 and the table 61, and the guide rails 42 and the base 62 and functions as lubrication, so that the needle 43 and the table 61 can be moved with higher accuracy. In particular, since no mechanical contact is made between the needle 43 and the table 61 and between the guide rails 42 and the base 62, it is possible to prevent vibrations or the like and to prevent scratch, wear, or the like.

Also, since the respective pipe lines 52, 57c, 58c are provided on a moving side, they are moved simultaneously as the needle 43 moves and the guide surfaces of the guide rail 42 are constantly supported irrespective of movement (stroke) of the needle 43. Accordingly, since designing can be made without caring for stroke, it can be enhanced in degree of freedom.

Also, since the first static-pressure pads 51 are provided on the needle 43, the guide rail 42 can guide the needle 43 from inside, and the needle 43 can be designed to be small in width and narrow, so that straightness is improved. Also, since the center of the first static-pressure pads 51 and the axis of the stator 3 are substantially the same, postural change at the time of movement is suppressed and high accuracy can be achieved.

Subsequently, a fourth embodiment of an actuator according to the invention will be described below with reference to FIGS. 16 to 22. In addition, the same constituents of the fourth embodiment as those of the third embodiment are denoted by the same reference numerals and an explanation therefor is omitted.

The fourth embodiment is different from the third embodiment in that while the respective pipe lines 52, 57c, 58c in the third embodiment are provided on the side of the needle 43, pipe lines 52, 57c, 58c in an actuator 70 according to the fourth embodiment are provided on a side of guide rails 42.

In addition, the actuator 70 according to the embodiment is a part that constitutes a table device 80 of the invention in the same manner as the third embodiment.

Figure 22:
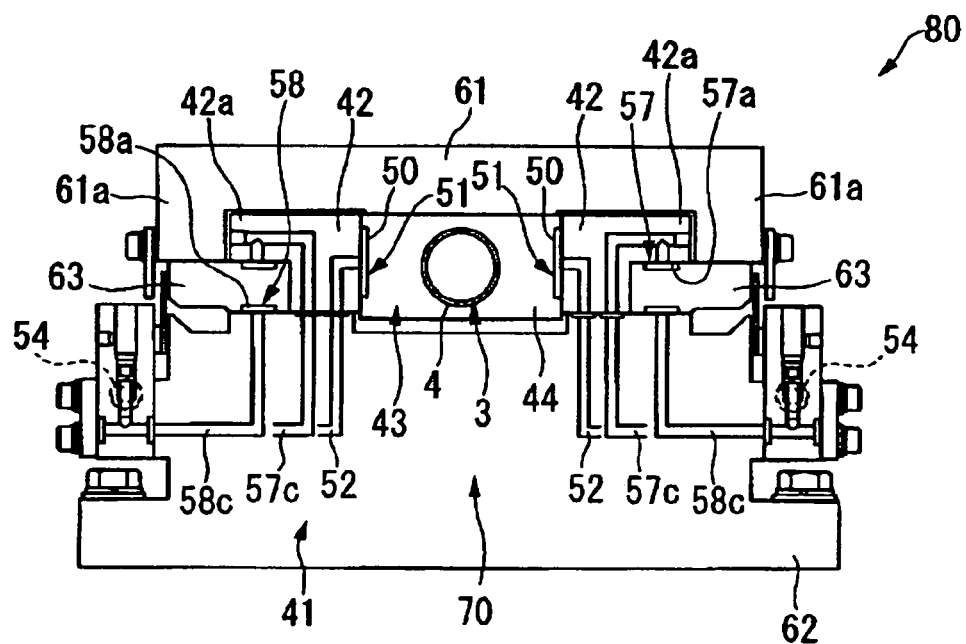
FIG. 22 is a cross sectional view taken along the line L-L and showing the table device of FIG. 20.
Figure 23:
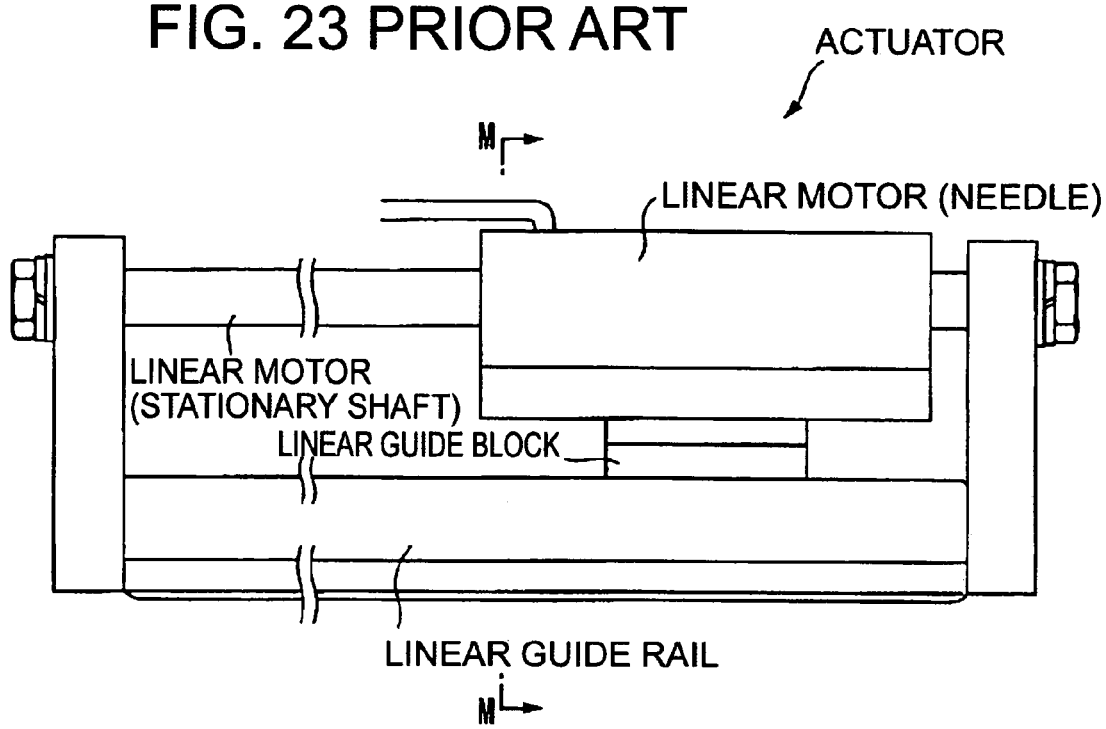
FIG. 23 is a side view showing an example of a conventional actuator.
Figure 24:
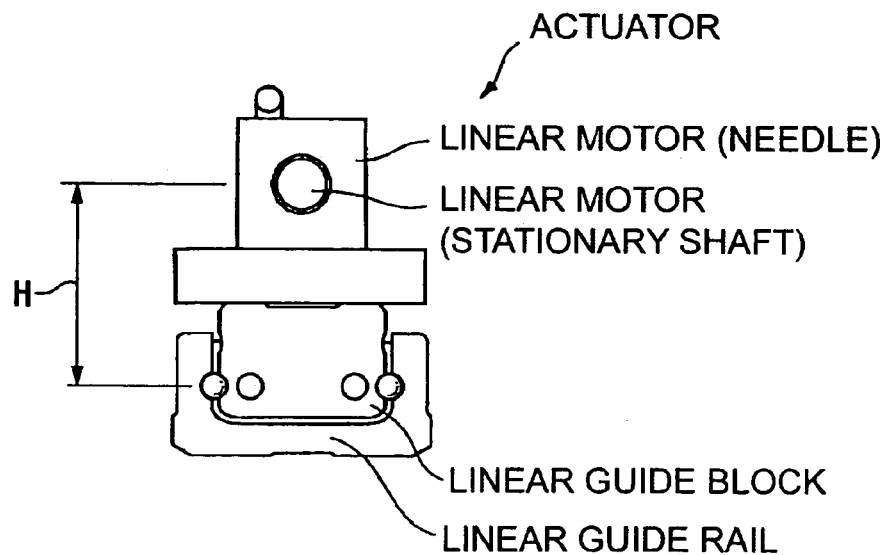
FIG. 24 is a cross sectional view taken along the line M-M and showing the actuator of FIG. 23.

As shown in FIG. 22, first pipe lines 52 are connected at one end thereof to sides of guide rails 42 and at the other ends thereof to common pipe lines 54 on sides of a base 62 through the guide rails 42 and the base 62. Also, likewise, second pipe lines 57c are also connected at the other ends thereof to the common pipe lines 54 through the guide rails 42 and the base 62. Also, third pipe lines 58c are connected at the other ends thereof to the common pipe lines 54. In addition, connection ports 55 of the common pipe lines 54 according to the embodiment are provided on sides of the base 62. Also, the respective pipe lines 52, 57c, 58c are arranged adjacent to one another.

Also, according to the embodiment, the table 61 is set in moving range such that fluid outlets (fluid outlets, through which a fluid is supplied to respective static-pressure pads 51, 57, 58), of the respective pipe lines 52, 57c, 58c are positioned inside ranges of recesses formed on the respective static-pressure pads 51, 57, 58.

With the table device 80 and the actuator 70 constructed in the above manner, the respective pipe lines 52, 57c, 58c are arranged on the guide rails 42 and the base 62, which are disposed on a stationary side, the respective pipe lines 52, 57c, 58c are not moved (dragged) when the needle 43 and the table 61 should be moved. Thereby, there is no need for any flow passages from the stationary side to a moving side, and there is no need of providing any expandable and contractible piping hoses midway the flow passages. Therefore, no reaction forces are generated due to extension and contraction of such piping hoses. Accordingly, the needle 43 and the table 61 do not meet with surplus resistance, so that the needle 43 and the table 61 can be more smoothly moved. Also, it is possible to make effective use of a space in the table 61.

In addition, the technical scope of the invention is not limited to the embodiments but can be variously modified within a scope not departing from the gist of the invention.

For example, while the needle in the first and second embodiments is linearly moved along the stator, linear movement is not limitative but the stator may extend curvedly in a predetermined direction. Also, while the respective embodiments are constructed such that the stator comprises a coil and the needle comprises a permanent magnet, the stator may comprise a permanent magnet and the needle may comprise a coil. Also, the magnet is not limited to a permanent magnet. Also, while the magnet and the coil are formed to be cylindrical-shaped, they are not limited thereto. For example, they may be formed to be flat-plate shaped or angular-shaped.

Further, while respective static-pressure pads are formed two on one side, that is, four in total on both sides, they are not limited thereto but may be formed one on one side, that is, two in total on both sides, or three or more on one side, that is, six or more in total on both sides.

Also, while the recesses are formed to extend in a direction along the guide rails to be elliptical-shaped, they are not limited to such elliptical shape but may be circular or square in shape and may be short in a longitudinal direction provided that they support the guide surfaces of the guide rails. In addition, in case of adopting an air static pressure, porous static-pressure pads may be used.

Also, the table device may be constructed to comprise the actuator according to the first and second embodiments. Further, it is preferable that a bearing working device be constructed to comprise the table device. By doing this, it is possible to achieve miniaturization and lightening of the entire bearing working device and to use the table device that operates with high accuracy.

What is claimed is:

1. An actuator comprising:
    a linear motor comprising a stationary shaft and a needle movable along a longitudinal direction of the stationary shaft, one of the stationary shaft and the needle having a magnet and the other of the stationary shaft and the needle having a coil;
    a guide rail extending in parallel to the stationary shaft and interposing the needle inside to guide the same; and
    support means interposed between the guide rail and the needle and disposed in coaxial relation with an axis of the stationary shaft for movably supporting the needle relative to the guide rail;
    wherein when a current is supplied to the coil, a magnetic flux acts between the magnet and the coil to generate a driving force by which the needle is moved along the longitudinal direction while being movably supported by the support means and guided by the guide rail.

2. An actuator according to claim 1; wherein the stationary shaft has the coil and the needle has the permanent magnet.

3. An actuator according to claim 1; wherein the support means comprises a plurality of rolling bodies provided on surfaces of the needle in a direction along the guide rail.

4. An actuator according to claim 1; wherein the support means comprises static-pressure pads disposed on a surface of the needle to support guide surfaces of the guide rail, flow passages connected to the static-pressure pads, and supply means for supplying a fluid at a predetermined pressure to the static-pressure pads via the flow passages.

5. An actuator according to claim 4; wherein the flow passages are provided in the needle.

6. An actuator according to claim 4; wherein the flow passages are provided in the stationary shaft and the guide rail.

7. A table device comprising: an actuator according to claim 1; and a table fixed to the needle of the actuator.

8. An actuator according to claim 1; wherein when an electrical current flows through the coil a magnetic flux is induced that acts between the coil and the permanent magnet to generate a driving force by which the needle is moved along the longitudinal direction of the stator shaft.

9. An actuator comprising:
    a linear motor comprising a stationary shaft and a needle movable along a longitudinal direction of the stationary shaft, one of the stationary shaft and the needle having a magnet and the other of the stationary shaft and the needle having a coil;
    a guide rail extending in parallel to the stationary shaft and interposing the needle inside to guide the same; and
    support means interposed between the guide rail and the needle for movably supporting the needle relative to the guide rail, at least two contact points between the support means and the needle being equally spaced-apart from an axis of the stationary shaft;
    wherein when a current is supplied to the coil, a magnetic flux acts between the magnet and the coil to generate a driving force by which the needle is moved along the longitudinal direction while being movably supported by the support means and guided by the guide rail.

10. An actuator according to claim 9; wherein the support means comprises a pair of support means; wherein a distance between a first point of action, at which one of the support means acts on the needle, and the axis of the stationary shaft and a distance between a second point of action, at which the other of the support means acts on the needle, and the axis of the stationary shaft are consistent with each other; and wherein the axis of the stationary shaft lies on a plane passing through the first and second points of action.

11. An actuator according to claim 9; wherein the stationary shaft has the coil and the needle has the permanent magnet.

12. An actuator according to claim 9; wherein the support means comprises a plurality of rolling bodies provided on surfaces of the needle in a direction along the guide rail.

13. An actuator according to claim 9; wherein the support means comprises static-pressure pads disposed on a surface of the needle to support guide surfaces of the guide rail, flow passages connected to the static-pressure pads, and supply means for supplying a fluid at a predetermined pressure to the static-pressure pads via the flow passages.

14. An actuator according to claim 13; wherein the flow passages are provided in the needle.

15. An actuator according to claim 13; wherein the flow passages are provided in the stationary shaft and the guide rail.

16. A table device comprising: an actuator according to claim 9; and a table fixed to the needle of the actuator.

17. An actuator according to claim 9; wherein when an electrical current flows through the coil a magnetic flux is induced that acts between the coil and the permanent magnet to generate a driving force by which the needle is moved along the longitudinal direction of the stator shaft.

18. An actuator comprising:
a linear motor comprising a stationary shaft and a needle movable along a longitudinal direction of the stationary shaft, one of the stationary shaft and the needle having a magnet and the other of the stationary shaft and the needle having a coil;
a guide rail extending in parallel to the stationary shaft and guiding the needle; and
support means interposed between the guide rail and the needle for movably supporting the needle relative to the guide rail, at least two contact points between the support means and the needle being equally spaced-apart from an axis of the stationary shaft;
wherein when a current is supplied to the coil, a magnetic flux acts between the magnet and the coil to generate a driving force by which the needle is moved along the longitudinal direction while being movably supported by the support means and guided by the guide rail.

19. An actuator according to claim 18; wherein the support means comprises a pair of support means; and wherein a distance between a first point of action, at which one of the support means acts on the needle, and the axis of the stationary shaft and a distance between a second point of action, at which the other of the support means acts on the needle, and the axis of the stationary shaft are consistent with each other.

20. An actuator according to claim 18; wherein the stationary shaft has the coil and the needle has the permanent magnet.

21. An actuator according to claim 18; wherein the support means comprises a plurality of rolling bodies provided on surfaces of the needle in a direction along the guide rail.

22. An actuator according to claim 18; wherein the support means comprises static-pressure pads disposed on a surface of the needle to support guide surfaces of the guide rail, flow passages connected to the static-pressure pads, and supply means for supplying a fluid at a predetermined pressure to the static-pressure pads via the flow passages.

23. An actuator according to claim 22; wherein the flow passages are provided in the needle.

24. An actuator according to claim 22; wherein the flow passages are provided in the stationary shaft and the guide rail.

25. A table device comprising: an actuator according to claim 18; and a table fixed to the needle of the actuator.

26. An actuator according to claim 18; wherein when an electrical current flows through the coil a magnetic flux is induced that acts between the coil and the permanent magnet to generate a driving force by which the needle is moved along the longitudinal direction of the stator shaft.

27. An actuator according to claim 18; wherein the guide rail guides the needle inside in a manner to be interposed by the needle.

28. An actuator comprising:
a linear motor comprising a stationary shaft and a needle movable along a longitudinal direction of the stationary shaft, one of the stationary shaft and the needle having a magnet and the other of the stationary shaft and the needle having a coil;
a guide rail that guides the needle along the longitudinal direction of the stationary shaft; and
support means for movably supporting the needle relative to the guide rail;
wherein when a current is supplied to the coil, a magnetic flux acts between the magnet and the coil to generate a driving force by which the needle is moved along the longitudinal direction while being movably supported by the support means and guided by the guide rail.

29. An actuator according to claim 28; wherein the support means comprises a plurality of rolling bodies extending in a direction along the guide rail.

30. An actuator according to claim 29; wherein the rolling bodies are disposed on surfaces of the needle.

31. An actuator according to claim 29; wherein the rolling bodies comprise cylindrical rolling bodies mounted on a plate at predetermined intervals in the direction along the guide rail.

32. An actuator according to claim 28; wherein when an electrical current flows through the coil a magnetic flux is induced that acts between the coil and the permanent magnet to generate a driving force by which the needle is moved along the longitudinal direction of the stator shaft.

\* \* \* \* \*